United States Patent
Itoh

(10) Patent No.: US 8,326,812 B2
(45) Date of Patent: *Dec. 4, 2012

(54) DATA SEARCH DEVICE, DATA SEARCH METHOD, AND RECORDING MEDIUM

(75) Inventor: Hideo Itoh, Machida (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,908

(22) Filed: Jun. 14, 2011

(65) Prior Publication Data

US 2011/0246455 A1    Oct. 6, 2011

Related U.S. Application Data

(63) Continuation of application No. 12/420,126, filed on Apr. 8, 2009, now Pat. No. 8,041,688.

(30) Foreign Application Priority Data

Apr. 10, 2008    (JP) ................................. 2008-102923

(51) Int. Cl.
G06F 17/30    (2006.01)
(52) U.S. Cl. ......... 707/693; 707/812; 707/802; 707/737
(58) Field of Classification Search .................. 707/693, 707/802, 812, 737
See application file for complete search history.

(56) References Cited

U.S. PATENT DOCUMENTS

| | | | | |
|---|---|---|---|---|
| 7,076,493 B2* | 7/2006 | Myers et al. | ................... | 707/749 |
| 8,019,776 B2* | 9/2011 | Nagoya | ........................... | 707/769 |
| 8,037,014 B1* | 10/2011 | Perelman et al. | ............. | 707/600 |
| 8,103,696 B2* | 1/2012 | Osako | ........................... | 707/791 |
| 2003/0009482 A1* | 1/2003 | Benerjee et al. | ............. | 707/200 |
| 2006/0149739 A1* | 7/2006 | Myers | ................................ | 707/9 |
| 2009/0182733 A1* | 7/2009 | Itoh | .................................. | 707/5 |

(Continued)

FOREIGN PATENT DOCUMENTS

JP    10-021257    1/1998

(Continued)

OTHER PUBLICATIONS

Office Action issued on Jul. 3, 2012, in counterpart Japanese Patent Application No. JP 2008-102923 (3 pages).

*Primary Examiner* — Kimberly Wilson
*Assistant Examiner* — Noosha Arjomandi
(74) *Attorney, Agent, or Firm* — Oblon, Spivak, McClelland, Maier & Neustadt, L.L.P.

(57) ABSTRACT

A data search device to extract relevant data matching a specified requirement from multiple pieces of data to be searched stored in a database. The data search device includes a specified requirement data acquisition unit to acquire specified requirement data including the specified requirement, a data extraction unit to extract the relevant data based on the specified requirement data, an extracted data counter to count a number of pieces of the relevant data for each piece of classification data provided for the data to be searched, a display data generation unit to generate data to display the number of pieces of the relevant data counted for each piece of classification data on a coordinate space based on the classification data, and a positional data storage unit to store positional data including coordinates for specifying a position in the coordinate space and the classification data associated with the coordinates.

15 Claims, 11 Drawing Sheets

U.S. PATENT DOCUMENTS

| | | |
|---|---|---|
| 2009/0187843 A1 | 7/2009 | Itoh |
| 2009/0259637 A1 | 10/2009 | Itoh |
| 2009/0276418 A1 | 11/2009 | Horibe et al. |

FOREIGN PATENT DOCUMENTS

| | | |
|---|---|---|
| JP | 10-143517 | 5/1998 |
| JP | 2002-175314 | 6/2002 |
| JP | 2004-178604 | 6/2004 |
| JP | 2004-318528 | 11/2004 |
| JP | 2007-233752 | 9/2007 |
| JP | 2008-191703 | 8/2008 |
| JP | 2009-169926 | 7/2009 |

* cited by examiner

A 6 1 C 5 / 0 8
- SECTION
- SUBSECTION
- CLASS
- MAIN GROUP
- SUBGROUP

FIG. 6

| SECTION | NUMBER OF DOCUMENTS | |
|---|---|---|
| A | * * | |
| B | * * | ... |
| . | . | |
| . | . | |
| . | . | |
| H | * * | |

| SECTION | NUMBER OF DOCUMENTS | AREA RATIO | |
|---------|---------------------|------------|---|
| A | * * | * * % | |
| B | * * | * * % | . . . |
| ⋮ | ⋮ | ⋮ | |
| H | * * | * * % | |

FIG. 9

| SECTION | COORDINATES | |
|---------|-------------|---|
| A | $(A_{X1}, A_{Y1}) - (A_{X2}, A_{Y2})$ | |
| B | $(B_{X1}, B_{Y1}) - (B_{X2}, B_{Y2})$ | . . . |
| ⋮ | ⋮ | |
| H | $(H_{X1}, H_{Y1}) - (H_{X2}, H_{Y2})$ | |

FIG. 10
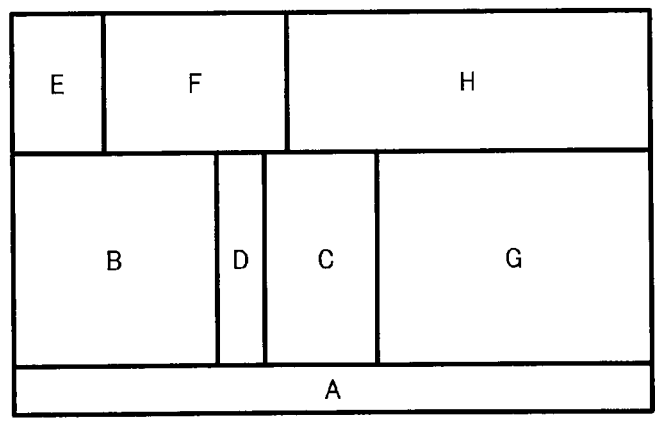
FIG. 11
| SECTION | SUBSECTION | COORDINATES | |
|---|---|---|---|
| A | 01 | $(A01_{X1}, A01_{Y1}) - (A01_{X2}, A01_{Y2})$ | |
| | 21 | $(A21_{X1}, A21_{Y1}) - (A21_{X2}, A21_{Y2})$ | |
| | ⋮ | ⋮ | ... |
| B | 01 | $(B01_{X1}, B01_{Y1}) - (B01_{X2}, B01_{Y2})$ | |
| | ⋮ | ⋮ | |
| H | 99 | $(H99_{X1}, H99_{Y1}) - (H99_{X2}, H99_{Y2})$ | |
FIG. 12
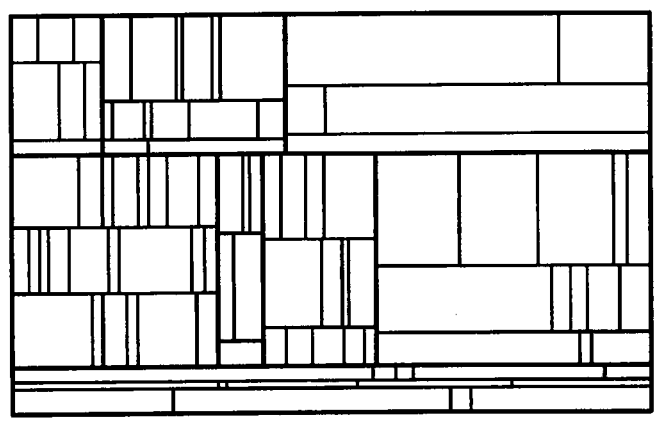

FIG. 13

| IPC | | | | COORDINATES |
|---|---|---|---|---|
| A | 01 | B | 1/ 00 | $(A01B1/00_{X1}, A01B1/00_{Y1}) - (A01B1/00_{X2}, A01B1/00_{Y2})$ |
| | | | 02 | $(A01B1/02_{X1}, A01B1/02_{Y1}) - (A01B1/02_{X2}, A01B1/02_{Y2})$ |
| | | | ⋮ | ⋮ |
| | | | 24 | $(A01B1/24_{X1}, A01B1/24_{Y1}) - (A01B1/24_{X2}, A01B1/24_{Y2})$ |
| | | 3/ 00 | | $(A01B3/00_{X1}, A01B3/00_{Y1}) - (A01B3/00_{X2}, A01B3/00_{Y2})$ |
| | | | ⋮ | ⋮ |
| | | C | 1/ 00 | $(A01C1/00_{X1}, A01C1/00_{Y1}) - (A01C1/00_{X2}, A01C1/00_{Y2})$ |
| | | | ⋮ | ⋮ |
| | 21 | B | 1/ 00 | $(A21C1/00_{X1}, A21C1/00_{Y1}) - (A21C1/00_{X2}, A21C1/00_{Y2})$ |
| | | | ⋮ | ⋮ |
| B | 01 | B | 1/ 00 | $(B01B1/00_{X1}, B01B1/00_{Y1}) - (B01B1/00_{X2}, B01B1/00_{Y2})$ |
| | | | ⋮ | ⋮ |
| H | 01 | B | 1/ 00 | $(H01B1/00_{X1}, H01B1/00_{Y1}) - (H01B1/00_{X2}, H01B1/00_{Y2})$ |
| | | | ⋮ | ⋮ |
| H | 99 | Z | 99/ 00 | $(H99Z99/00_{X1}, H99Z99/00_{Y1}) - (H99Z99/00_{X2}, H99Z99/00_{Y2})$ |

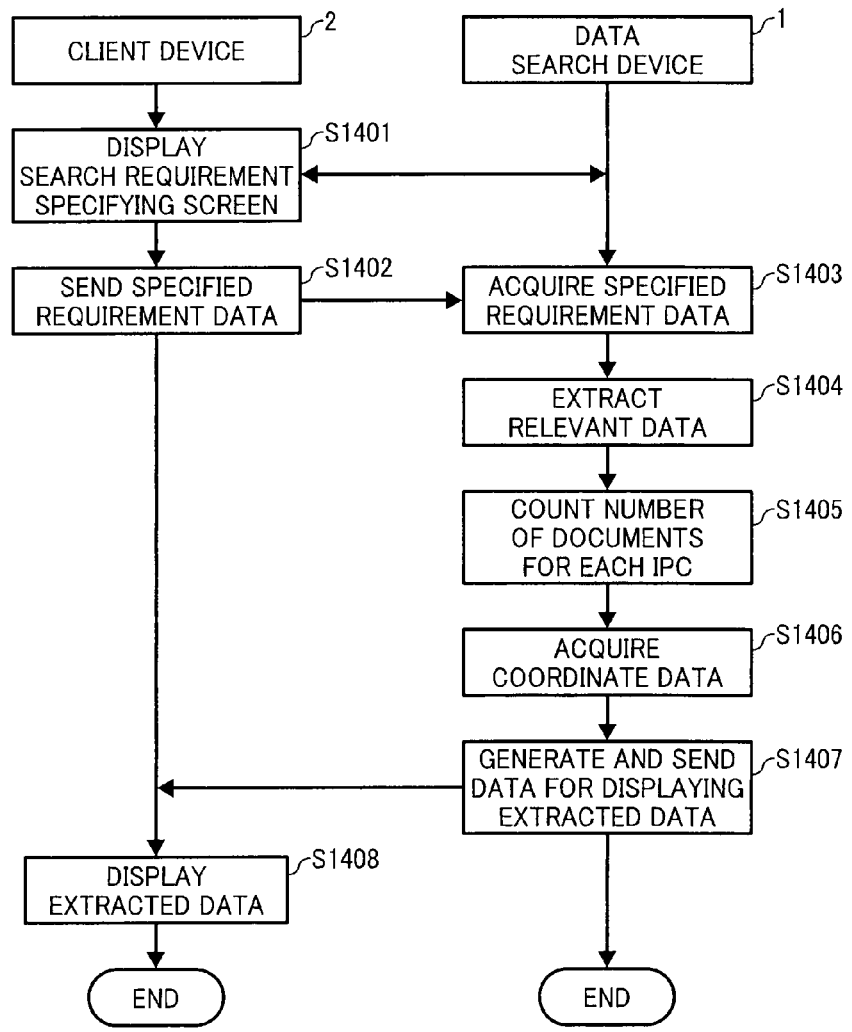

FIG. 16
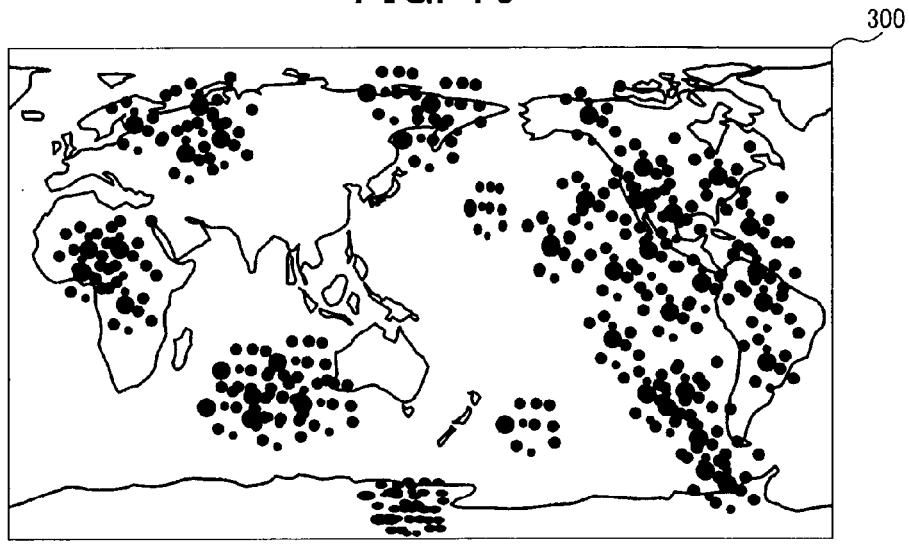
FIG. 17
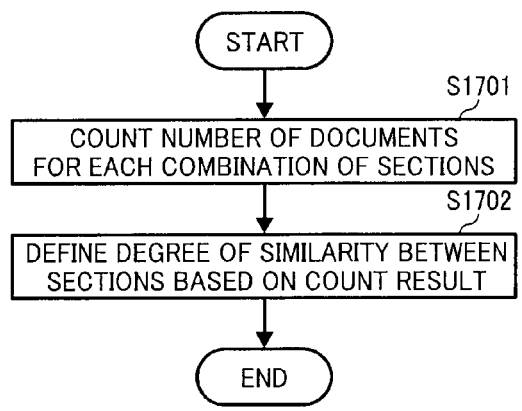
FIG. 18
| IPC | NUMBER OF DOCUMENTS |
|---|---|
| A & B | *** |
| A & C | *** |
| A & D | *** |
| A & E | *** |
| ⋮ | |

DATA SEARCH DEVICE, DATA SEARCH METHOD, AND RECORDING MEDIUM

CROSS-REFERENCE TO RELATED APPLICATIONS

This application is a continuation of U.S. application Ser. No. 12/420,126, filed Apr. 8, 2009 now U.S. Pat. No. 8,041,688, and is based upon and claims the benefit of priority from prior Japanese Patent Application No. 2008-102923, filed on Apr. 10, 2008. The entire contents of each of the above-listed applications are incorporated herein by reference.

BACKGROUND OF THE INVENTION

1. Field of the Invention

Exemplary aspects of the present invention generally relate to a data search device, a data search method employed in the data search device, and a recording medium including a control program for causing the data search device to execute the data search method, and particularly relate to how to display results of data search.

2. Description of the Background

Ever-increasing amounts of searchable data and search results have elevated the importance of technologies for searching electronic data and displaying the search results in an easy-to-understand format. When the number of search results is too large, it is difficult for a user to find the desired data.

To solve this problem, a technique in which search results are classified into clusters based on their content in order to display the search results on a two-dimensional coordinate space is proposed.

In the above-described technique, two clusters of document units are extracted from a document database and a degree of relevance between each element in the clusters is calculated to display the results on a two-dimensional coordinate space in accordance with a level of the degree of relevance thus calculated. As a result, a user can visually confirm which data is relevant to the document units extracted from the document database.

However, because it is necessary to analyze words included in the document in the above-described technique, it takes a longer time to search the data. Consequently, it is difficult to apply the above-described technique to, for example, a search method for acquiring search results while changing search requirements.

Further, because coordinate axes of the two-dimensional coordinate space are dynamically determined based on the group of documents to be searched and the search results, a different group of documents searched and the search results cannot be two-dimensionally displayed in an overlapping manner on the same coordinate space so as to allow the user to compare search results.

It is to be noted that the above-described problems may occur when searching data other than document data including texts, such as image data.

SUMMARY

In view of the foregoing, illustrative embodiments of the present invention provide a data search device in which a user can easily confirm search results displayed thereon.

In one illustrative embodiment, a data search device to extract relevant data matching a specified requirement from multiple pieces of data to be searched stored in a database includes a specified requirement data acquisition unit to acquire specified requirement data including the specified requirement, a data extraction unit to extract the relevant data based on the specified requirement data acquired by the specified requirement data acquisition unit, an extracted data counter to count a number of pieces of the relevant data extracted by the data extraction unit for each piece of classification data provided for the data to be searched for classifying the data to be searched based on contents thereof, a display data generation unit to generate data to display the number of pieces of the relevant data counted for each piece of classification data on a coordinate space based on the classification data, and a positional data storage unit to store positional data including coordinates for specifying a position in the coordinate space and the classification data associated with the coordinates. The positional data is generated based on data specified by a number of pieces of the data to be searched counted for each piece of classification data and the classification data to determine a position for each piece of classification data in the coordinate space such that pieces of classification data having similar content are displayed near each other. The display data generation unit generates the data such that the number of pieces of the relevant data is displayed at a position specified by the coordinates associated with the classification data included in the positional data.

Another illustrative embodiment provides a data search method for a data search device including a specified requirement data acquisition unit, a data extraction unit, an extracted data counter, a display data generation unit, and a positional data generation unit to extract relevant data matching a specified requirement from multiple pieces of data to be searched stored in a database. The data search method includes the steps of acquiring specified requirement data including the specified requirement using the specified requirement data acquisition unit; extracting the relevant data based on the specified requirement data acquired by the specified requirement data acquisition unit using the data extraction unit; counting a number of pieces of the relevant data extracted by the data extraction unit for each piece of classification data provided for the data to be searched for classifying the data to be searched based on contents thereof using the extracted data counter; generating positional data including coordinates for specifying a position in a coordinate space and the classification data associated with the coordinates based on data specified by a number of pieces of the data to be searched counted for each piece of classification data and the classification data, such that pieces of classification data having similar content are displayed near each other in the coordinate space using the positional data generation unit; and generating data to display the number of pieces of the relevant data counted for each piece of classification data in the coordinate space based on the classification data such that the number of pieces of the relevant data counted for each piece of classification data is displayed at a position specified by the coordinates associated with the classification data included in the positional data using the display data generation unit.

Yet another illustrative embodiment provides a recording medium storing a control program that, when read by a data processing device, causes a data search device to execute a data search method for a data search device including a specified requirement data acquisition unit, a data extraction unit, an extracted data counter, a display data generation unit, and a positional data generation unit to extract relevant data matching a specified requirement from multiple pieces of data to be searched stored in a database. The data search method includes the steps of acquiring specified requirement data including the specified requirement using the specified requirement data acquisition unit; extracting the relevant data based on the specified requirement data acquired by the specified requirement data acquisition unit using the data extraction unit; counting a number of pieces of the relevant data extracted by the data extraction unit for each piece of classification data provided for the data to be searched for classifying the data to be searched based on contents thereof using the extracted data counter; generating positional data including coordinates for specifying a position in a coordinate space and the classification data associated with the coordinates based on data specified by a number of pieces of the data to be searched counted for each piece of classification data and the classification data, such that pieces of classification data having similar content are displayed near each other on the coordinate space using the positional data generation unit; and generating data to display the number of pieces of the relevant data counted for each piece of classification data on the coordinate space based on the classification data such that the number of pieces of the relevant data counted for each piece of classification data is displayed at a position specified by the coordinates associated with the classification data included in the positional data using the display data generation unit.

Additional features and advantages of the present invention will be more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein:

FIG. 6 is a table illustrating an example of data generated by the process illustrated in FIG. 4;

FIG. 7 is a view illustrating examples of classification data provided for data to be searched;

FIG. 8 is a table illustrating another example of data generated by the process illustrated in FIG. 4;

FIG. 9 is a table illustrating yet another example of data generated by the process illustrated in FIG. 4;

FIG. 10 is a view illustrating an example of areas of a coordinate space divided for each piece of classification data;

FIG. 11 is a table illustrating yet another example of data generated by the process illustrated in FIG. 4;

FIG. 12 is a view illustrating another example of areas of the coordinate space divided for each piece of classification data;

FIG. 13 is a table illustrating yet another example of data generated by the process illustrated in FIG. 4;

FIG. 14 is a flowchart illustrating steps in a process of searching data;

FIG. 15 is a table illustrating an example of data including relevant-document count data;

FIG. 16 is a view illustrating an example of an extracted data display screen;

FIG. 17 is a flowchart illustrating steps in a process of determining similarity between sections according to a first illustrative embodiment;

FIG. 18 is a table illustrating data generated by the process illustrated in FIG. 17;

DETAILED DESCRIPTION OF ILLUSTRATIVE EMBODIMENTS

Figure 1:
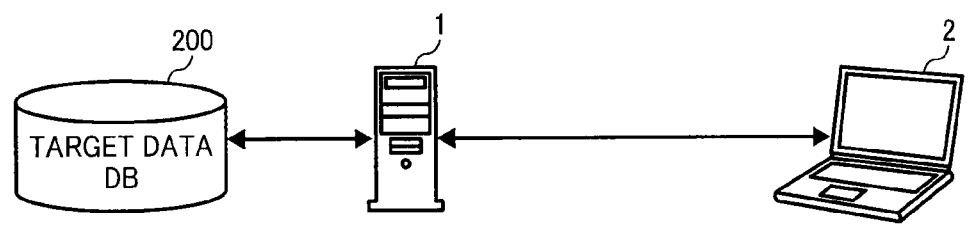
FIG. 1 is a schematic view illustrating a configuration of a data search system according to illustrative embodiments.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

In the following illustrative embodiments, a data search system including a document search device to search patent documents including image data such as texts and drawings is described in detail. It should be noted that the following illustrative embodiments can also be applied to any system for searching data other than patent documents, such as books stored in a library, data independently managed, paintings, and so forth, to provide the same effects.

FIG. 1 is a schematic view illustrating a configuration of a data search system according to illustrative embodiments.

Referring to FIG. 1, the data search system includes a data search device 1, a client device 2, and a target data DB 200. An example of the client device 2 includes a well-known data processing device such as a personal computer (PC). The data search device 1 is connected to the client device 2 via a network, and searches target data stored in the target data DB 200 in response to search requests from the client device 2. The target data DB 200 stores data on patent documents as data to be searched. It is to be noted that, although provided separately from the data search device 1 according to illustrative embodiments, the target data DB 200 may be integrated into the data search device 1. The target data DB 200 includes a nonvolatile data storage unit such as an HDD.

Figure 2:
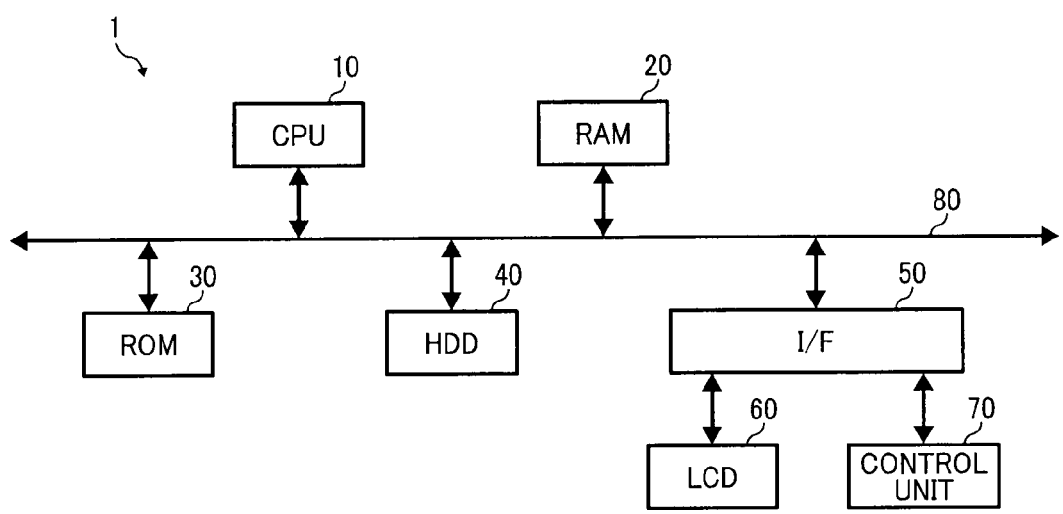
FIG. 2 is a block diagram illustrating a hardware configuration of a data search device according to illustrative embodiments.

A description is now given of a hardware configuration of the data search device 1 according to illustrative embodiments using FIG. 2. FIG. 2 is a block diagram illustrating a hardware configuration of the data search device 1. The data search device 1 includes a central processing unit (CPU) 10, a random access memory (RAM) 20, a read-only memory (ROM) 30, a hard disk drive (HDD) 40, and an I/F 50. The above-described components are connected to one another via a bus 80. The I/F 50 is further connected to a liquid crystal display (LCD) 60 and a control unit 70.

The CPU 10 serves as operating means, and controls operations of the data search device 1. The RAM 20 is a volatile recording medium capable of reading and writing data at higher speed, and is used as a work space when the CPU 10 processes data. The ROM 30 is a nonvolatile read-only storage medium, and stores programs such as freeware. The HDD 40 is a nonvolatile storage unit in which data can be read from and written to, and holds the operating system (OS) as well as various control programs, application programs, and so forth.

The I/F 50 connects and controls the bus 80 and a variety of hardware, networks, and so forth. The LCD 60 is a visual user interface that enables a user to confirm the state or status of the data search device 1. The control unit 70 is a user interface such as a keyboard and a mouse such that the user can input data to the data search device 1. As illustrated in FIG. 1, the data search device 1 according to illustrative embodiments operates as a server. Accordingly, the user interfaces such as the LCD 60 and the control unit 70 may be omitted.

In the data search device 1 having the above-described configuration, the programs stored in the ROM 30, the HDD 40, or on a storage medium such as an optical disk, not shown, are read out by the RAM 20 and operated under control of the CPU 10 to implement a software control unit. The software control unit and the hardware described above are combined to implement a functional configuration of the data search device 1 according to illustrative embodiments. A description is now given of the functional configuration of the data search device 1 with reference to FIG. 3.

Figure 3:
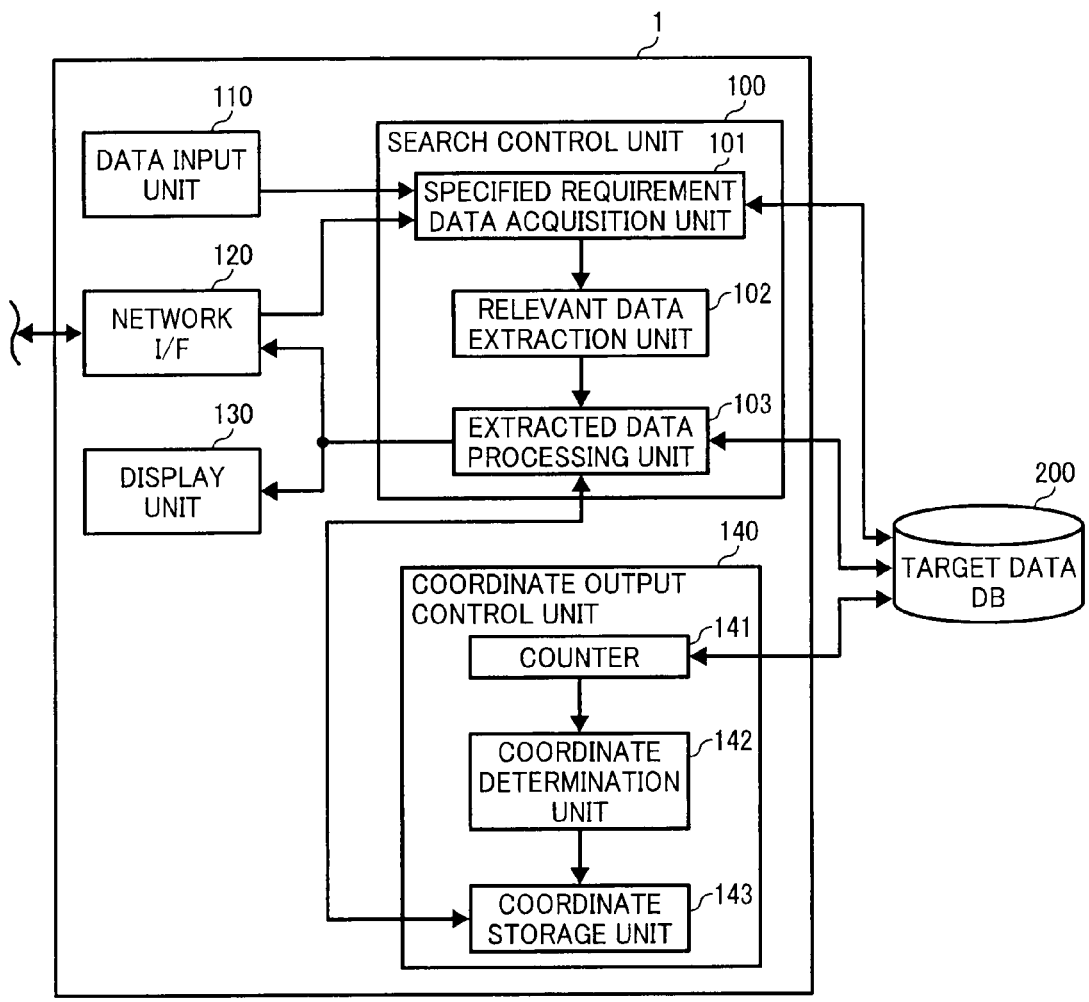
FIG. 3 is a block diagram illustrating a functional configuration of the data search device.

FIG. 3 is a block diagram illustrating the functional configuration of the data search device 1 and the target data DB 200 storing data to be searched by the data search device 1. Referring to FIG. 3, the data search device 1 includes a search control unit 100, a data input unit 110, a network I/F 120, a display unit 130, and a coordinate output control unit 140.

The user operates the data search device 1 to input data into the search control unit 100 through the data input unit 110. The data input unit 110 is implemented by the I/F 50 and the control unit 70 illustrated in FIG. 2. The network I/F 120 serves as an interface such that the data search device 1 receives and sends data via the network, and is implemented by the I/F 50 illustrated in FIG. 2. Specifically, the I/F 50 is implemented by interfaces connected to Ethernet® or USB ports. The display unit 130 displays the operating status of the data search device 1, search results, and so forth, and is implemented by the I/F 50 and the LCD 60 illustrated in FIG. 2.

The search control unit 100 provides a search function of the data search device 1, and includes a specified requirement data acquisition unit 101, a relevant data extraction unit 102, and an extracted data processing unit 103. Specified requirement data is specified by the user as a requirement for extracting target data from the target data DB 200. The specified requirement data acquisition unit 101 acquires data input by the user through the data input unit 110 or data input through the network I/F 120 via the network as the specified requirement data. The specified requirement data acquisition unit 101 is implemented by operating the program loaded in the RAM 20 illustrated in FIG. 2 under the control of the CPU 10.

The relevant data extraction unit 102 extracts data from the target data DB 200 as relevant data based on the specified requirement data acquired by the specified requirement data acquisition unit 101. Specifically, the relevant data extraction unit 102 serves as a data extraction unit to extract data matching the requirement specified as the specified requirement data from the target data DB 200. Such a data extraction unit is implemented by operating the program loaded in the RAM 20 illustrated in FIG. 2 under the control of the CPU 10.

The extracted data processing unit 103 generates and outputs data for displaying extracted data so that the relevant data extracted by the relevant data extraction unit 102 is displayed on the display unit 130 or on a display unit of the client device 2. Specifically, the extracted data processing unit 103 functions as a data generation unit to generate the data for displaying the extracted data to cause the display unit 130 or the display unit of the client device 2 to display the relevant data extracted from the target data DB 200 as data matching the requirement specified by the specified requirement data. Such a data generation unit is implemented by operating the program loaded in the RAM 20 illustrated in FIG. 2 under the control of the CPU 10. When generating the data for displaying the extracted data, the extracted data processing unit 103 references data generated by the coordinate output control unit 140 to be described in detail below.

The coordinate output control unit 140 controls coordinates displayed on a coordinate space by visually classifying the data stored in the target data DB 200 based on classification data such as international patent classification (IPC). The coordinate output control unit 140 includes a counter 141, a coordinate determination unit 142, and a coordinate storage unit 143. Although the IPC scheme is used as the classification data in illustrative embodiments, alternatively, file index (FI), F term (file forming term), current US classification, and so forth may be used as the classification data. The coordinate output control unit 140 controls the coordinates for displaying the data stored in the target data DB 200 on a two-dimensional coordinate space. It is to be noted that, alternatively, a coordinate space other than the two-dimensional coordinate space, such as a three-dimensional coordinate space, may be used.

The counter 141 counts the number of discrete pieces of data stored in the target data DB 200 for each type of classification data. The counter 141 is implemented by operating the program loaded in the RAM 20 illustrated in FIG. 2 under the control of the CPU 10. The coordinate determination unit 142 determines an area for displaying the extracted data on the coordinate space for each type of classification data based on the count result obtained by the counter 141 and similarity between each type of classification data. Specifically, the coordinate determination unit 142 functions as a display area determination unit to determine the area for displaying each of the types of classification data on the coordinate space, that is, the two-dimensional coordinate space according to illustrative embodiments. Such a display area determination unit is implemented by operating the program loaded in the RAM 20 illustrated in FIG. 2 under the control of the CPU 10. The coordinate determination unit 142 generates coordinate data including the area determined as described above, and causes the coordinate storage unit 143 to store the coordinate data.

The coordinate storage unit 143 stores the coordinate data generated by the coordinate determination unit 142. When the search control unit 100 searches data stored in the target data DB 200 and the extracted data processing unit 103 generates the data for displaying the extracted data, the area for displaying the relevant data extracted by the relevant data extraction unit 102 is determined based on the coordinate data stored in the coordinate storage unit 143.

The data search device 1 according to illustrative embodiments controls the coordinate data and generation of the data for displaying the extracted data performed by the coordinate output control unit 140 and the search control unit 100, respectively.

Figure 4:
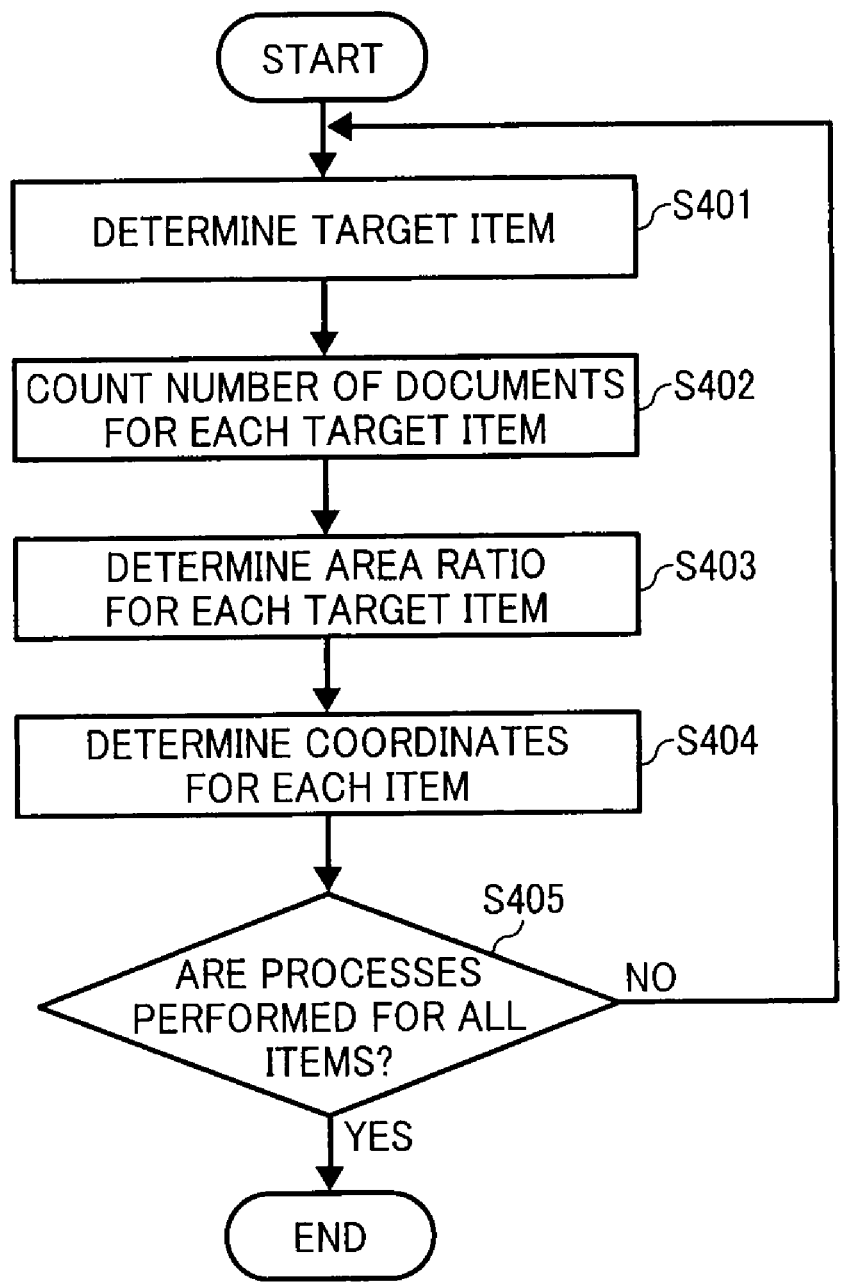
FIG. 4 is a flowchart illustrating steps in a process of generating coordinate data.

A description is now given of the operation of the data search device 1 according to illustrative embodiments using FIG. 4. FIG. 4 is a flowchart illustrating steps in a process performed by the coordinate output control unit 140 to generate the coordinate data based on IPC symbols provided for the data stored in the target data DB 200. Referring to FIG. 4, at S401, the coordinate output control unit 140 determines a target item among items included in the IPC symbol to generate the coordinate data. The items included in each of the IPC symbols are described in detail below with reference to FIG. 5.

Figure 5:
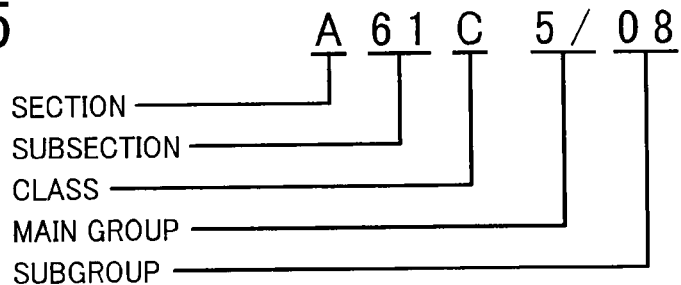
FIG. 5 is a view illustrating an example of a classification data structure.

FIG. 5 is a view illustrating a structure of an example of an IPC symbol of "A61C 5/08". As illustrated in FIG. 5, each IPC symbol is divided into items of section, subsection, class, main group, and subgroup, from first to last. Specifically, in the example illustrated in FIG. 5, "A" indicates the section, "61" indicates the subsection, "C" indicates the class, "5/" indicates the main group, and "08" indicates the subgroup, respectively.

Returning to FIG. 4, at S401, one of the items is selected as a target item in order from first to last of the items included in the IPC symbol. Specifically, the section is selected as a target item at S401 for a first series of processes performed to generate the coordinate data. Subsequently, at S402, the counter 141 counts the number of documents stored in the target data DB 200 for each letter indicating the section. It is to be noted that the section included in the IPC symbol consists of a letter from A to H. Specifically, at S402, the counter 141 counts the number of documents provided with the IPC symbol for each section from A to H. In other words, the counter 141 functions as a target data counting unit, and is implemented by operating the program loaded in the RAM 20 illustrated in FIG. 2 under the control of the CPU 10. FIG. 6 is a table illustrating data generated by the process of S402. As a result, data on the number of documents provided with the IPC symbol is generated for each section from A to H as illustrated in FIG. 6.

It is to be noted that multiple IPC symbols may be provided for a single patent document. For example, as illustrated in FIG. 7, there may be a case in which three IPC symbols of "G06F 1/26", "H02J 1/00", and "H02J 9/06" are provided for a single patent document. In such a case, "G" and "H" are provided as a letter indicating the section of the IPC symbols. Accordingly, the patent document having the IPC symbols illustrated in FIG. 7 is counted as one document including the section G, and two documents including the section H because each of the IPC symbols of "H02J 1/00" and "H02J 9/06" is counted as a document including the section H. As a result, the above-described patent document provided with the IPC symbols illustrated in FIG. 7 is counted as one document for the section G and two documents for the section H.

In illustrative embodiments, ratios of areas for displaying each IPC symbol on the coordinate space are determined based on the number of documents provided with respective IPC symbols stored in the target data DB 200. Specifically, in the example illustrated in FIG. 7, a ratio between an area for displaying data on the patent documents provided with the IPC symbol of "H02J 1/00" and an area for displaying data on the patent documents provided with the IPC symbol of "H02J 9/06" is determined based on the number of the patent documents provided with each of the above-described IPC symbols. The counting method described above is used to accurately determine the areas to be displayed on the coordinate space based on the number of the patent documents provided with the respective IPC symbols.

Returning to FIG. 4, after generating the data on the number of documents for each section included in the IPC symbols as illustrated in FIG. 6, at S403, the counter 141 determines the ratio of areas of the coordinate space for displaying data on the patent documents provided with the IPC symbols for each item, that is, the section in the example illustrated in FIG. 6, based on a percentage of the number of the patent documents counted at S402. FIG. 8 is a table illustrating data generated as a result of the process of S403. Specifically, data indicating the ratio of the area of the coordinate space for displaying the patent documents respectively provided with the IPC symbols is generated for each of the sections from A to H as illustrated in FIG. 8. The ratio of the area for each of the sections from A to H is represented by percentage, and a sum of the ratios for all the sections from A to H is 100%.

Returning to FIG. 4, after the data on the ratio of the area of the coordinate space is generated for each section as illustrated in FIG. 8, at S404, the coordinate determination unit 142 determines coordinates of each area of the coordinate space for displaying the patent documents provided with the IPC symbols for each section based on the ratios of the areas thus generated. In other words, both the counter 141 for generating the data on the ratios of the areas of the coordinate space and the coordinate determination unit 142 function as a positional data generation unit. Such positional data generation unit is implemented by operating the program loaded in the RAM 20 illustrated in FIG. 2 under the control of the CPU 10. FIG. 9 is a table illustrating data generated as a result of S404. Data indicating the coordinates of each area of the coordinate space for displaying the patent documents provided with the IPC symbols is generated for each of the sections from A to H by the process of S404 as illustrated in FIG. 9.

FIG. 10 is a view illustrating the areas of the coordinate space divided based on the coordinate data generated by the process of S404. Referring to FIG. 10, the coordinate determination unit 142 generates the coordinate data such that the coordinate space is divided into rectangular areas. In addition, as illustrated in FIG. 9, the coordinate determination unit 142 specifies the coordinates at diagonally opposed corners (for example, an upper right corner and a lower left corner) of each rectangle to specify the position for each rectangle.

Further, when determining the area of the coordinate space for each section of the IPC symbol, the coordinate determination unit 142 generates the coordinate data such that the sections having similar contents are placed near each other. In the example illustrated in FIG. 10, for example, it is determined that the section A is similar to the sections B, D, C, and G, and the section B is similar to the sections E, F, D, and A. The similarity between the sections is determined based on the sections included in the IPC symbols provided for the patent documents to be searched stored in the target data DB 200, and a detailed description thereof is given later. The coordinate determination unit 142 causes the coordinate storage unit 143 to store the coordinate data illustrated in FIG. 9.

Returning to FIG. 4, after the coordinate data is generated at S404, at S405, the coordinate output control unit 140 determines whether or not the processes up to S404 are performed for all items included in the IPC symbol, that is, up to the subgroup illustrated in FIG. 5. Here, because the processes up to S404 are completed for the section only, the coordinate output control unit 140 determines that the processes are not completed (NO at S405). Thereafter, the process is returned to S401 so that the coordinate output control unit 140 selects the subsection, which is the item subsequent to the section, as the target item, and the processes from S402 to S405 are repeated as described above.

Specifically, when the subsection illustrated in FIG. 5 is selected as a target item at S401 in FIG. 4, at S402, a number of patent documents stored in the target data DB 200 is counted for each subsection for each of the sections from A to H. As illustrated in FIG. 5, the subsection is represented by two-digit numbers from 01 to 99. It is to be noted that the numbers from 01 to 99 used for indicating the subsection are varied for each section.

Data generated by the processes from S402 to S404 when the subsection is selected as a target item at S401 is illustrated in FIG. 11. After the processes from S402 to S404 are performed, the coordinate data for each section illustrated in FIG. 8 is further divided into each subsection as illustrated in FIG. 11, so that coordinate data is generated for each subsection. When determining an area of the coordinate space for displaying data on each subsection, the coordinate determination unit 142 generates the coordinate data such that the subsections having similar contents are placed near each other.

FIG. 12 is a view illustrating areas of the coordinate space divided based on the coordinate data illustrated in FIG. 11. As illustrated in FIG. 12, the areas of the coordinate space divided into each subsection are obtained by further dividing the areas divided for each section as illustrated in FIG. 10. When generation of the coordinate data for dividing the areas of the coordinate space for each subsection is completed, the coordinate output control unit 140 performs the process of S405 again. The processes from S402 to S404 are repeated until the processes are performed for the rest of the items included in the IPC symbol such as the class, the main group, and the subgroup.

When the processes from S402 to S404 are performed for the all items from the section to the subgroup included in the IPC symbol (YES at S405), the coordinate data generated by the coordinate determination unit 142, that is, the coordinate data for dividing the areas of the coordinate space based on the all items from the section to the subgroup, is stored in the coordinate storage unit 143, and this sequence of steps in a single processing routine is ended.

With the above-described process, data including the data on the areas of the coordinate space for each item and the classification data for each item associated with the data on the areas of the coordinate space is generated and stored in the coordinate storage unit 143. An example of the data stored in the coordinate storage unit 143 is illustrated in FIG. 13. As illustrated in FIG. 13, the data generated by the processes illustrated in FIG. 4 and stored in the coordinate storage unit 143 includes the coordinate data indicating the areas displayed on the coordinate space for each item included in the IPC symbol.

For example, referring to FIG. 13, the patent document provided with the IPC symbol of "A01B 1/00" is displayed in a rectangular area having diagonal corners at coordinates of $(A01B1/00_{X1}, A01B1/00_{Y1})$ and $(A01B1/00_{X2}, A01B1/00_{Y2})$ on the coordinate space. Specifically, the data illustrated in FIG. 13 is used as positional data storing the coordinate data specifying a position in the coordinate space and the IPC symbol serving as the classification data, the position and the symbol being associated with each other. The coordinate storage unit 143 storing the data illustrated in FIG. 13 functions as a positional data storage, implemented by operating the program loaded in the RAM 20 illustrated in FIG. 2 under the control of the CPU 10.

As described above, according to illustrative embodiments, the position for the search result displayed on the coordinate space is determined based on a hierarchical structure of the classification data provided for the patent document to be searched. In other words, the coordinate space is divided according to the hierarchical structure of the classification data. As a result, the target document can be reliably found among even a large number of documents within a reasonable amount of time.

When search results based on the requirement specified by the user are visually displayed on the coordinate space, the position for the search results displayed on the coordinate space is determined based on the data generated as described above. A description is now given of searching for the target data and display of the search result according to illustrative embodiments.

FIG. 14 is a flowchart illustrating steps in a process of searching data in the data search system according to illustrative embodiments. As illustrated in FIG. 14, when the data stored in the target data DB 200 is searched, at S1401, the user operates the client device 2 to obtain data from the data search device 1 to display a search requirement specifying screen for specifying a search requirement. It should be noted that, although the user operates the client device 2 to use functions of the data search device 1 in the example to be described below, the same processes are performed when the user operates the data input unit 110 of the data search device 1 to use the functions of the data search device 1 for searching data.

At S1402, the user inputs text, keywords, bibliographic data, and so forth through the control unit of the client device 2 as a requirement for extracting target data from the target data DB 200, and sends such a requirement to the data search device 1 as specified requirement data. At S1403, the specified requirement data thus sent to the data search device 1 is input to the data search device 1 from the network I/F 120, and acquired by the specified requirement data acquisition unit 101 of the search control unit 100.

At S1404, the relevant data extraction unit 102 extracts relevant data from the target data DB 200 based on the specified requirement data acquired by the specified requirement data acquisition unit 101. The relevant data extraction unit 102 extracts relevant data including patent documents including the keywords or words included in the text, each of which is input as the specified requirement data, or patent documents matching the bibliographic data input as the specified requirement data. In other words, the relevant data extraction unit 102 functions as a data extraction unit for extracting relevant data matching data to be searched stored in the target data DB 200. Such a data extraction unit is implemented by operating the program loaded in the RAM 20 illustrated in FIG. 2 under the control of the CPU 10.

Thereafter, at S1405, the extracted data processing unit 103 references the IPC symbols provided for the patent documents thus extracted as the relevant data, and counts the number of documents for each IPC symbol to generate a table (hereinafter referred to as relevant-document count data). At that time, when multiple IPC symbols are provided for a single patent document, the number of documents counted by the extracted data processing unit 103 is one for each IPC symbol. For example, the patent document having the IPC symbols illustrated in FIG. 7 is counted as one document for "G06F 1/26", one document for "H02J 1/00", and one document for "H02J 9/06", so that such a patent document is counted as three documents. The extracted data processing unit 103 functions as an extracted data counter for counting the number of pieces of the relevant data for each type of classification data. Such an extracted data counter is implemented by operating the program loaded in the RAM 20 illustrated in FIG. 2 under the control of the CPU 10.

FIG. 15 is a table illustrating the relevant-document count data generated by the process of S1405. The relevant-document count data generated by the process of S1405 includes the IPC symbols provided for the patent documents extracted as the relevant data and the number of documents having such IPC symbols. For example, in the example illustrated in FIG. 15, there are 25 documents provided with the IPC symbol of "A01B 1/14" in the relevant data.

Returning to FIG. 14, at S1406, the extracted data processing unit 103 acquires the coordinate data illustrated in FIG. 13 stored in the coordinate storage unit 143. Thereafter, at S1407, the extracted data processing unit 103 generates data for displaying the extracted data to display the extracted data, and sends the data to the client device 2 via the network I/F 120. In other words, the extracted data processing unit 103 functions as a display data generation unit for generating the data for displaying the extracted data. The client device 2 receives the data, and displays the extracted data on the display unit thereof at S1408 to complete this processing routine.

Generation of the data for displaying the extracted data at S1407 is described in detail below with reference to FIG. 16.

FIG. 16 is a view illustrating an example of an extracted data display screen 300 displayed on the display unit of the client device 2 at S1408. Coordinates on the extracted data display screen 300 illustrated in FIG. 16 include a world map as a background, and correspond to the coordinates on the coordinate space described above with reference to FIG. 13. On the extracted data display screen 300 illustrated in FIG. 16, dots each having a size corresponding to the number of the relevant documents provided with the respective IPC symbols are displayed in areas including corresponding coordinates based on the relevant-document count data illustrated in FIG. 15.

In other words, at S1407, the extracted data processing unit 103 generates the data for displaying the extracted data such that each of the dots having a size corresponding to the number of the relevant documents provided with the respective IPC symbols is displayed in an area including the coordinates corresponding to each IPC symbol, that is, the coordinates associated with each IPC symbol in the coordinate data illustrated in FIG. 13, based on the relevant-document count data. As a result, the relevant data thus extracted can be displayed on the coordinate space based on the contents of the relevant data. In other words, the extracted data processing unit 103 functions as a display data generation unit. Such a display data generation unit is implemented by the program loaded in the RAM 20 illustrated in FIG. 2 under the control of the CPU 10.

When the area for each section of the IPC symbol on the coordinate space is determined, similarity between the sections is determined based on the section included in the IPC symbol provided for the patent document to be searched stored in the target data DB 200. A description is now given of such a determination of similarity between the sections.

FIG. 17 is a flowchart illustrating steps in a process of determining similarity between sections according to a first illustrative embodiment. As illustrated in FIG. 17, when the similarity between the sections is determined, at S1701, the counter 141 counts the number of patent documents stored in the target data DB 200 for each combination of the sections. Specifically, for example, the number of documents stored in the target data DB 200 is counted in such a way that the number of documents provided with the IPC symbols including the sections A and B, the sections A and C, and so on is sequentially counted.

The data generated at S1701 is illustrated in FIG. 18, and includes a combination of the sections and the number of documents for each combination. In the data illustrated in FIG. 18, it is determined that the combinations of the sections having a larger number of documents counted by the counter 141 are more similar to each other. Accordingly, at S1702, the coordinate output control unit 140 defines a combination of those sections having the larger number of documents as having a stronger similarity based on the data illustrated in FIG. 18, and ends the processing routine. In other words, the coordinate output control unit 140 functions as a similarity data generation unit for generating data on a degree of similarity between the classification data. Such a similarity data generation unit is implemented by operating the program loaded in the RAM 20 illustrated in FIG. 2 under the control of the CPU 10.

Similarity between the sections is defined by performing the above-described process based on contents of the data stored in the target data DB 200, that is, the classification data such as the IPC symbols provided for the patent documents. In other words, the data generated by the processes illustrated in FIG. 17 is used as data indicating the degree of similarity between the classification data. The process illustrated in FIG. 17 may be performed at S404 illustrated in FIG. 4, or before S404 to define and store the data on the degree of similarity between the sections in the coordinate output control unit 140 or other storage medium.

As described above, when the coordinates of the areas of the coordinate space are determined for the subsection and the subordinate items as illustrated in FIGS. 11 and 12, the distribution of the areas is determined based on the degree of similarity defined for each item including the subsection, the class, the main group, and the subgroup. Accordingly, the degree of similarity for each item described above is also defined in the same way as illustrated in FIG. 17 or in a way pursuant to the way illustrated in FIG. 17. Alternatively, the degree of similarity for each item included in the IPC symbols may be defined by the user and input to the coordinate output control unit 140 through the data input unit 110 or the network I/F 120.

As described above, the data search device 1 according to illustrative embodiments determines the areas for each IPC symbol displayed on the coordinate space based on the coordinate data generated by the processes illustrated in FIG. 4 and stored in the coordinate storage unit 143.

In a related-art data search device, a coordinate space displayed on an extracted data display screen is dynamically defined depending on each search result. Consequently, the search results extracted based on different search requirements cannot be displayed in an overlapping manner on the same screen, making it difficult to compare the search results.

By contrast, in the data search device 1 according to illustrative embodiments, the coordinate data for displaying the extracted data on the coordinate space is defined in advance and stored in the coordinate storage unit 143. Accordingly, multiple extracted data display screens 300 generated based on different search requirements can be displayed in an overlapping manner to easily compare the search results. As a result, the user can easily confirm a difference in distribution of the search results.

In such a case, a dot indicating one search result is displayed differently from a dot indicating another search result, so that the user can easily and clearly recognize the difference between the two. For example, each of the dots can be displayed differently from each other by changing a color of the dots or by being represented by shapes other than that of a dot.

In the extracted data display screen 300 according to illustrative embodiments, the dot indicating the extracted data is displayed on fixed coordinate axes. As a result, when the user who knows the definition of the classification data such as the IPC symbols very well confirms the extracted data display screen 300, the user can easily recognize the search results based on the position of each dot. In other words, the search results can be displayed with in an easy-to-understand, more useful, and more informative manner.

Figure 19:
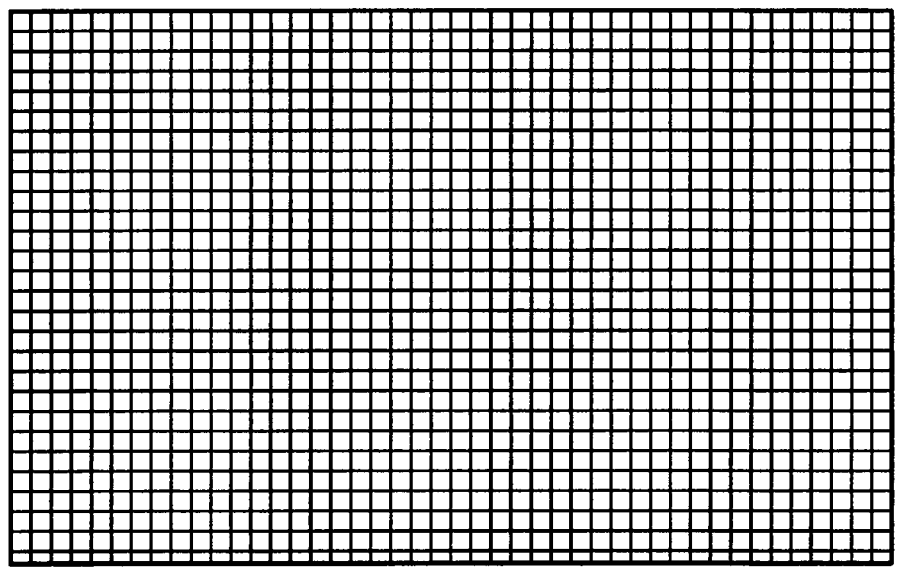
FIG. 19 is a view illustrating an example of areas of a coordinate space divided by classification data according to a comparative example.
Figure 20:
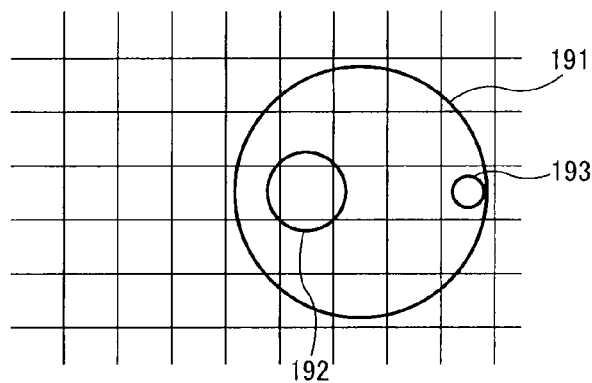
FIG. 20 is a view illustrating an example of dots displayed on the coordinate space according to the comparative example.

When dots having sizes corresponding to the number of the documents provided with the IPC symbols are displayed on the coordinate space defined in advance as in the case of the extracted data display screen 300, their coordinates are required to be precisely defined. For example, when an area for displaying a dot corresponding to each IPC symbol is equalized for all IPC symbols as illustrated in FIG. 19, a size of a dot 191 may be larger than the area assigned for each IPC symbol as illustrated in FIG. 20. Consequently, a dot 192 displayed on an area adjacent to the area for the dot 191, or a dot 193 displayed close to the dot 191, may be covered by the dot 191. As a result, the user cannot accurately confirm the distribution of the dots displayed based on the extracted data.

Figure 21:
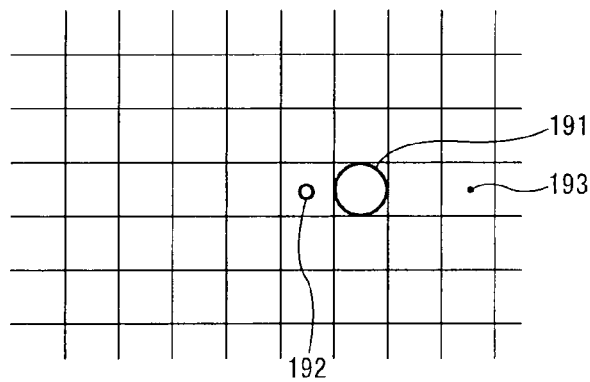
FIG. 21 is a view illustrating another example of dots displayed on the coordinate space according to the comparative example.

Further, in the case illustrated in FIG. 19, when the maximum size of the dot is limited to the area assigned for a single IPC symbol such that dots are not covered with other dots, sizes of the dots 192 and 193 may become too small relative to the area assigned for the single IPC symbol as illustrated in FIG. 21. Consequently, it is difficult for the user to accurately confirm the distribution of the dots displayed based on the extracted data.

To solve the above-described problems, according to illustrative embodiments, the area of the coordinate space for displaying the data on the patent document provided with the IPC symbol is determined based on the ratio of the number of the documents provided with the respective IPC symbols stored in the target data DB 200. Accordingly, a case like that illustrated in FIG. 20, in which the size of the dot 191 exceeds the area assigned for a single IPC symbol and the other dots 192 and 193 are covered by the dot 191, can be prevented. Similarly, a case like that illustrated in FIG. 21, in which the size of the dots 192 and 193 becomes too small, can be prevented.

In addition, when the distribution of the areas of the coordinate space for displaying data on the patent documents provided with the respective IPC symbols is determined as illustrated in FIGS. 10 and 12, the distribution is determined such that the IPC symbols including similar contents are displayed near each other. Accordingly, in the extracted data display screen 300 illustrated in FIG. 16, the dots indicating the patent documents including similar contents are displayed near each other. As a result, the distribution of the dots displayed on the extracted data display screen 300 is determined based on the contents of the patent documents matching the requirement specified by the user, providing useful data for data analysis to the user.

Further, as illustrated in FIG. 16, a world map is displayed on the extracted data display screen 300 as a background thereof, and dots having sizes corresponding to the number of the documents provided with the respective IPC symbols are displayed at the corresponding coordinates. When the dots indicating the extracted data are displayed on the screen having a background including some motif, the user can easily confirm the search results displayed on the screen. Well-known motifs such as a world map illustrated in FIG. 16 may be preferable as backgrounds. In particular, because positions of the dots can be indicated by geographic names, maps such as a world map may be preferable as backgrounds.

As described above, according to illustrative embodiments, a single patent document provided with multiple IPC symbols is counted as a single document for each IPC symbol. Alternatively, only the first IPC symbol among the multiple IPC symbols provided for the patent document may be counted at the process of S402 in FIG. 4 or S1405 in FIG. 14.

When the number of documents counted for each piece of classification data such as the IPC symbol is represented by a dot having a size corresponding to the number of documents thus counted as illustrated in FIG. 16, a center of each dot is placed at a center of the area for the corresponding IPC symbol on the coordinate space. Alternatively, in place of the dot, the number of documents may be variably represented by changing the density of a color of the area used for the corresponding IPC symbol on the coordinate space.

As described above, a position of the dot corresponding to the IPC symbol is specified by the area using the coordinates at two points of the area as illustrated in FIG. 13. Alternatively, a pair of coordinates may be specified as a center of the dot and stored in the coordinate storage unit 143.

As illustrated in FIG. 3, the data search device 1 according to illustrative embodiments includes the coordinate output control unit 140 including the counter 141 and the coordinate determination unit 142. However, the counter 141 and the coordinate determination unit 142 are used only for generating the coordinate data illustrated in FIG. 13 and storing the coordinate data in the coordinate storage unit 143, but not used for searching data. Accordingly, the data search device 1 configured to search document data stored in the target data DB 200 includes at least the coordinate storage unit 143 for storing coordinate data, and the counter 141 and the coordinate determination unit 142 may be omitted.

In a case in which a target to be searched is a published patent application, the number of documents stored in the target data DB 200 may increase with time. As a result, the number of documents for each piece of classification data also changes. Therefore, it is preferable to regularly update the coordinate data stored in the coordinate storage unit 143. The data search device 1 includes the counter 141 and the coordinate determination unit 142 to regularly update the coordinate data stored in the coordinate storage unit 143.

As illustrated in FIG. 17, the number of documents stored in the target data DB 200 is counted for all combinations of the sections to define the degree of similarity between each section based on the number of the documents counted for each combination. The other method for defining the degree of similarity between each section is described in detail below with reference to FIG. 22.

Figures 22, 23, 24:
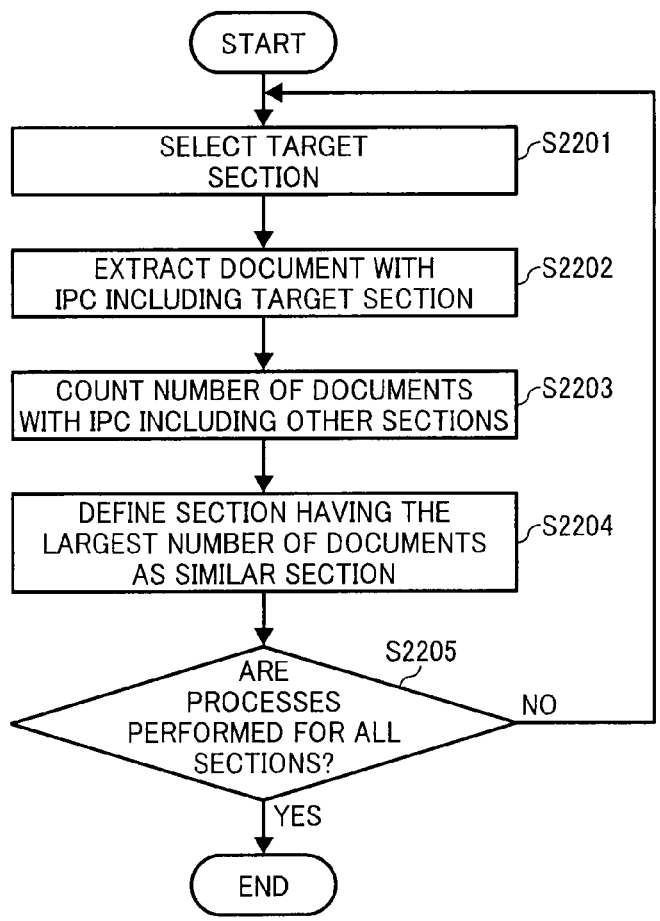
FIG. 22 is a flowchart illustrating steps in a process of determining a degree of similarity between sections according to a second illustrative embodiment.
FIG. 23 is a table illustrating data generated by the process illustrated in FIG. 22.
FIG. 24 is a table illustrating data on similarity between sections generated by the process illustrated in FIG. 22.

FIG. 22 is a flowchart illustrating steps in a process of determining a degree of similarity between sections according to a second illustrative embodiment. As illustrated in FIG. 22, at S2201, the coordinate output control unit 140 selects a single section among the sections from A to H as a target section. Here, it is assumed that the section A is selected as a target section.

At S2202, the counter 141 extracts patent documents provided with the IPC symbols including the target section from the target data DB 200. At S2203, the counter 141 references the other sections included in the IPC symbols provided with the extracted document to count the number of documents for each section.

FIG. 23 is a table illustrating data generated at S2203. As illustrated in FIG. 23, the number of documents is counted for each section except the section A to generate the table.

In the table illustrated in FIG. 23, it is determined that the sections including the larger number of documents have a stronger similarity to the section A. Accordingly, at S2204, the coordinate output control unit 140 defines the section including the largest number of documents as similar to the section A based on the table illustrated in FIG. 23. Processing from S2201 to S2205 is repeated until similarity between the section A and all the other sections is defined. When the degree of similarity between the section A and all the other sections is defined (YES at S2205), the processing routine is ended.

FIG. 24 is a table illustrating data on similarity between the sections generated by the processes illustrated in FIG. 22. As illustrated in FIG. 24, the sections that are most similar to each other are defined as similar sections as a result of the process illustrated in FIG. 22. Although only a single section including the largest number of document is defined as the similar section based on the table illustrated in FIG. 23 in the example illustrated in FIG. 22, all sections including a predetermined number of documents may be defined as similar sections, or multiple sections may be defined as similar sections in order of the number of documents.

As illustrated in FIG. 14, keywords, text, or bibliographic data is acquired as the specified requirement data. Alternatively, however, for example, when an image is searched, image data included in a target to be searched, that is, document data in the foregoing illustrative embodiments, and image data input as a search requirement are converted into one-dimensional strings to extract relevant data in a similar way as in a word search. As a result, the foregoing illustrative embodiments are applicable to other types of searches, such as image searches as well as word searches, and produce the same effect.

In the foregoing illustrative embodiments, a patent document is a target to be searched. Alternatively, however, for example, the foregoing illustrative embodiments are also applicable to search books at a library. In such a case, classification numbers of Nippon Decimal Classification or the like used for classifying books are used as the classification data in place of the IPC symbols of the foregoing illustrative embodiments.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the spirit and scope of the present invention, and all such modifications as would be obvious to one skilled in the art are intended to be included within the scope of the following claims.

The number of constituent elements, locations, shapes and so forth of the constituent elements are not limited to any of the structure for performing the methodology illustrated in the drawings.

What is claimed is:

1. A data search device to extract relevant data matching a requirement from multiple pieces of data to be searched stored in a database, the data search device comprising:
   a hardware processor;
   a requirement data acquisition unit, implemented by the hardware processor, to acquire requirement data including the requirement;
   a data extraction unit to extract the relevant data based on the requirement data acquired by the requirement data acquisition unit;
   an extracted data counter to count a number of pieces of the relevant data extracted by the data extraction unit for a respective piece of classification data provided for the data to be searched for classifying the data to be searched based on contents thereof;
   a display data generation unit to generate data to display the number of pieces of the relevant data counted for the respective piece of classification data; and
   a positional data storage unit to store positional data associated with the classification data,
   wherein the positional data is generated based on data specified by a number of pieces of the data to be searched and counted for the respective piece of classification data and based on the respective piece of classification data to determine a position for the respective piece of classification data such that pieces of classification data having similar content are displayed near each other, and the display data generation unit generates the data such that the number of pieces of the relevant data is displayed at a position associated with the classification data based on the positional data.

2. The data search device according to claim 1, wherein the positional data is generated by determining a position, for the respective piece of classification data, in a coordinate space.

3. The data search device according to claim 2, wherein multiple pieces of classification data that are distinct from each other are associated with each of the multiple pieces of data to be searched stored in the database, and
   data indicating similarity between the multiple pieces of classification data is generated.

4. The data search device according to claim 1, wherein the multiple pieces of data stored in the database specify books available at a library.

5. The data search device according to claim 2, wherein the coordinate space is a three-dimensional coordinate space.

6. The data search device according to claim 2, wherein the coordinate space is divided according to a hierarchical structure of the classification data.

7. The data search device according to claim 1, wherein the requirement is a user-specified requirement.

8. The data search device according to claim 1, further comprising:
   a positional data generation unit to generate the positional data based on data specified by a number of pieces of the data to be searched that is counted for the respective piece of classification data, and the classification data.

9. The data search device according to claim 3, wherein the positional data generation unit generates the positional data based on a degree of similarity among the multiple pieces of classification data.

10. The data search device according to claim 9 wherein position indicators, each having a size corresponding to the number of pieces of the relevant data, are displayed for the respective piece of classification data.

11. The data search device according to claim 10, wherein the position indicators are displayed, on a geographic map, with geographic names corresponding to geographic areas in which the position indicators are located.

12. The data search device according to claim 1, wherein the requirement data includes image data.

13. The data search device according to claim 1, wherein the positional data is generated, based on the data specified by the number of pieces of the data to be searched and counted, for each of the pieces of classification data.

14. A data search method for a data search device comprising a requirement data acquisition unit, a data extraction unit, an extracted data counter, a display data generation unit, and a positional data generation unit to extract relevant data matching a requirement from multiple pieces of data to be searched stored in a database, the data search method comprising the steps of:

acquiring, by at least one hardware processor of the data search device, requirement data including the requirement;

extracting the relevant data based on the requirement data acquired by the requirement data acquisition unit;

counting a number of pieces of the relevant data extracted by the data extraction unit for a respective piece of classification data provided for the data to be searched for classifying the data to be searched based on contents thereof;

generating data to display the number of pieces of the relevant data counted for the respective piece of classification data; and storing positional data associated with the coordinates, wherein the positional data is generated based on data specified by a number of pieces of the data to be searched and counted for the respective piece of classification data and based on the respective piece of classification data to determine a position for the respective piece of classification data such that pieces of classification data having similar content are displayed near each other, and the display data generation unit generates the data such that the number of pieces of the relevant data is displayed at a position associated with the classification data based on the positional data.

15. A non-transitory computer readable storage medium storing a control program that, when read by a data processing device, causes a data search device to execute a data search method for a data search device comprising a requirement data acquisition unit, a data extraction unit, an extracted data counter, a display data generation unit, and a positional data generation unit to extract relevant data matching a requirement from multiple pieces of data to be searched stored in a database, the data search method comprising the steps of:

acquiring requirement data including the requirement;

extracting the relevant data based on the requirement data acquired by the requirement data acquisition unit;

counting a number of pieces of the relevant data extracted by the data extraction unit for a respective piece of classification data provided for the data to be searched for classifying the data to be searched based on contents thereof;

generating data to display the number of pieces of the relevant data counted for the respective piece of classification data; and storing positional data associated with the coordinates, wherein the positional data is generated based on data specified by a number of pieces of the data to be searched and counted for the respective piece of classification data and based on the respective piece of classification data to determine a position for the respective piece of classification data such that pieces of classification data having similar content are displayed near each other, and the display data generation unit generates the data such that the number of pieces of the relevant data is displayed at a position associated with the classification data based on the positional data.

\* \* \* \* \*